United States Patent Office 2,777,830
Patented Jan. 15, 1957

2,777,830
DYEABLE POLYESTERS

Joseph Clois Shivers, Jr., West Chester, Pa., assignor to E. I. du Pont de Nemours and Company, Wilmington, Del., a corporation of Delaware No Drawing. Application May 7, 1953,
Serial No. 353,688

11 Claims. (Cl. 260—75)

This invention relates to fibers, filaments, yarns, films and other structures of new condensation polymers which have affinity for acid dyestuffs. The invention also relates to new fiber-forming condensation polymers which are stable to melt spinning and stable to subsequent processing of the structure, but which are easily converted into polymers readily dyeable with acid dyestuffs without substantial loss in physical properties of the structure.

Fiber-forming condensation polymers prepared from polymethylene glycols and terephthalic acid or esters thereof are attractive polymers. These polymers are eminently suited for melt spinning into filaments which can be drawn and formed into textile yarns of unusually good properties. However, these yarns and fabrics made therefrom can be dyed at normal temperatures only with the acetate class of dyestuffs. This limits the field of usefulness of the fiber. The number of classes of dyes that can be applied to these yarns may be broadened by modification of the polymer with basic amino groups so that acid colors may be applied to the finished yarn. However, attempts to copolymerize dibasic acids or glycols containing the tertiary amino group with polymethylene glycols and terephthalic acid or esters thereof lead to highly discolored polymers having low molecular weights. Furthermore, the use of dibasic acids or glycols containing a primary amino group in polyester formation leads to cross-linked materials which cannot be satisfactorily processed into fibers, filaments, yarns or films.

Therefore, an object of this invention is to provide a new fiber-forming condensation polymer which can be readily converted into a polymer which is easily dyeable. Another object of this invention is to provide a textile yarn, filament, fiber or film of a condensation polymer that is capable of being dyed with acid colors. Still another object of this invention is to provide a new condensation polymer containing a primary amine. Another object is the provision of a method to convert imido groups contained in a polymer to primary amine groups. Other objects will be apparent from the description that follows.

The objects of this invention are accomplished by polymerizing linear condensate polymer-forming ingredients with a cyclic dicarboxylimido difunctional compound of the group consisting of dicarboxyl acids, the anhydrides or the esters thereof, or of a diglycol so as to form a linear condensation polymer containing the cyclic dicarboxylimido group. The condensation polymer may be formed by polymerizing the cyclic dicarboxylimido difunctional compound with a dicarboxylic compound and/or a glycol as with terephthalic acid or one of its esters and/or ethylene glycol. While two component polymers can be produced using the cyclic dicarboxylimido compounds of this invention, it is preferred to prepare polymers of three or more components, and, in general, polymers containing from about 2% to about 15% of the cyclic dicarboxylimido group are most useful. Depending upon the properties desired in the shaped articles, more or less of the imido component will be used. In general, polymers containing about 0.5% of nitrogen derived from the imido component are produced, for at this level the shaped articles are readily dyeable. The amount of nitrogen may vary from about 0.2% to about 7.5%, depending in part upon the imido compound used in the polymer preparation. Preferably, the cyclic dicarboxylimido group is attached to an intermediate chain carbon as would result from copolymerizing a phthalimido or succinimido compound to give a linear condensation polymer containing the group,

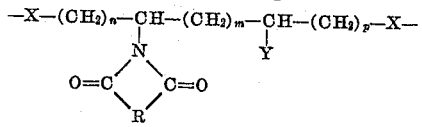

where X is COO if an imido dicarboxylic compound is used or X is O if an imido glycol is used; $n$, $m$ and $p$ may be 0 or an integer from 1 to 20; $n+m+p$ equals at least 2 and is not more than 40; Y is hydrogen or another cyclic dicarboxylimido group and R is a divalent radical, either aromatic or aliphatic in character.

Such polymers are stable at elevated temperatures and may be melt spun. Filaments, fibers, yarns or other structures formed thereof may be subjected to drawing and other aftertreating processes as desired and then the dicarboxyl groups in the imido linkage may be hydrolyzed therefrom to yield a new polymer readily dyeable with acid colors and containing primary amine groups. If desired, hydrolysis of the imido groups in polymer may be effected prior to drawing with substantially the same results. When the dicarboxylimido group is attached to an intermediate carbon of the chain, the polymer will contain the following structure after the hydrolysis treatment,

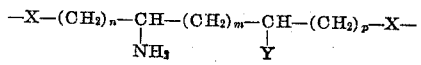

where X is COO or O; each of $n$, $m$ and $p$ may be 0 or an integer from 1 to 20 and the sum of $n$, $m$ and $p$ is at least 2 but not more than 40 and where Y is hydrogen, NH$_2$ or a cyclic dicarboxylimido group if hydrolysis is incomplete. The hydrolysis step is not a severe hydrolysis, and there is no appreciable degradation of the polymer chain. The resulting structure has substantially the same physical properties as before.

The following examples will serve to illustrate this invention. In these examples, which are not limitative, parts are by weight.

Example I

A reaction mixture was prepared using 645 parts of dimethylterephthalate, 650 parts of ethylene glycol (200% excess), 71 parts of diethyl alpha-phthalimidosebacate and, as a catalyst, 0.02% of zinc borate and 0.02% of litharge based on the weight of the dimethylterephthalate. The reactants were heated to 220° C. at atmospheric pressure in a reaction vessel until the ester exchange was complete as evidenced by the cessation of the evolution of alcohol from the reaction mixture. The resulting reaction product was then subjected to vacuum and heated to 260° C. while being suitably agitated. The polymerization reaction was continued for 4 hours at an absolute pressure of less than 1.0 mm. of mercury. At the end of this time, the reaction vessel was cooled, causing the polymeric material to solidify. This polymer was light tan in color, had an intrinsic viscosity of 0.68 and is believed to have the structure,

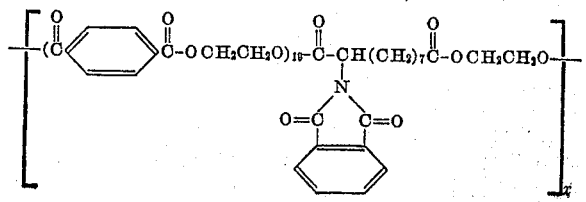

since analysis for nitrogen showed 0.35% while the theoretical nitrogen content according to this structure is also 0.35%.

The polymer of this example was melt-spun to form 180 denier yarn consisting of 10 filaments and was subsequently drawn 3.5 times. In the drawing step, a roll heated to 80° C. was interposed between the feed rolls and the draw rolls over which the yarn was passed to fix the draw point better and to produce more uniformly drawn yarn. This yarn could not be dyed with acid colors. The physical properties of the drawn yarn were as follows: tenacity, 1.7 grams per denier; elongation, 36; denier, 53.

The yarn in the form of skeins was subjected to the action of a 1% solution of hydrazine in ethanol at a temperature of 78° C. for 1 hour to hydrolyze the phthaloyl group from the polymer, thereby yielding a polymer of the following structure,

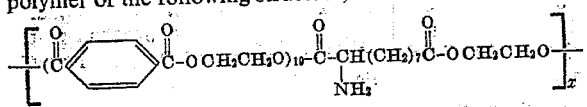

This hydrolyzed yarn was of good color and quality and was readily dyeable with a number of acid dyes. This is further evidence of the presence of primary amine groups. The yarn exhibited the following physical properties which are not greatly different from those shown above for the drawn yarn containing the phthalimido group: tenacity, 1.3 grams per denier; elongation, 25%; denier, 51.

*Example II*

A polymer was prepared from 19.4 parts of dimethylterephthalate, 18.6 parts of ethylene glycol (200% excess) and 0.9 part of diethyl alpha, alpha'-diphthalimidosebacate in the manner disclosed under Example I to yield a polymer containing about 2 mol per cent of ethylene diphthalimidosebacate. Nitrogen analysis was 0.24% against a theoretical nitrogen content of 0.24% based on the following structure,

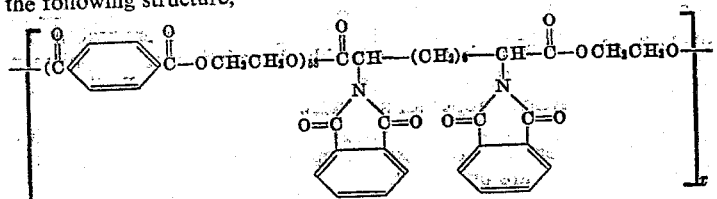

Yarn melt-spun from this polymer and drawn 3.5 times had properties similar to the yarn of Example I as did the yarn after hydrolysis in a hot alcoholic solution of hydrazine. The hydrolyzed polymer contained primary amine groups as was evidenced by marked affinity of the polymer for acid dyes.

*Example III*

A polymer was prepared from 17.4 parts of dimethylterephthalate, 18.6 parts ethylene glycol (200% excess) and 3.2 parts of diethyl alpha-phthalimidoadipate in the manner disclosed in Example I. The polymer contained about 12% phthalimidoadipate groups and by analysis 0.65% nitrogen was found against a theoretical nitrogen content of 0.67% based on the following structure,

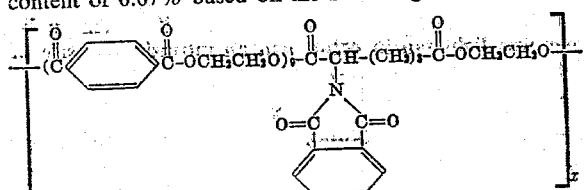

The polymer was readily melt spinnable without darkening. When spun and drawn into multifilament yarn, the yarn properties were of the order previously set forth. Hydrolysis of the yarn in a hot alcoholic solution of hydrazine produced a polymer containing primary amine groups and was readily dyeable with a number of acid dyes.

*Example IV*

A polymer was prepared from 184 parts of dimethylterephthalate, 186 parts of ethylene glycol (200% excess) and 20 parts of diethyl alpha-phthalimidosebacate, as described under Example I. The resulting polymer contained about 5 mol percent of phthalimidosebacate, was melt spun and drawn into multifilament yarns and was then subjected to hydrolysis for 1 hour by means of a 1% solution of ethylene diamine in ethyl alcohol heated to 78° C. The yarn so treated was readily dyed with an acid dye indicating the presence of primary amine groups.

*Example V*

A polymer drawn yarn prepared from dimethylterephthalate, ethylene glycol and diethyl alpha, alpha'-diphthalimidosebacate, as described under Example II, was subjected to hydrolysis for 1 hour in 5% aqueous solution of ethylene diamine heated to 98° C. The resulting yarn was readily dyeable with acid dyes indicating the presence of primary amine groups.

*Example VI*

A polymer was prepared from 19.4 parts of dimethylterephthalate, 18.6 parts of ethylene glycol (200% excess) and 1.63 parts of diethyl alpha-succinimidosebacate in the manner described in Example I. Analysis of the resulting polymer showed 0.29% nitrogen which corresponds closely to the following structure,

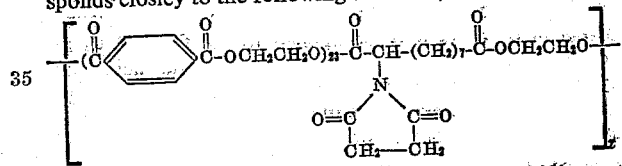

This polymer was melt-spun and drawn into multifilament yarn and as such showed no affinity for acid dyes. However, after subjecting a sample of this yarn to the action of a 1% solution of ethylene diamine in ethyl alcohol heated to 78° C. for 1 hour, the yarn thus hydrolyzed was readily dyeable with a number of acid colors indicating the presence of primary amine groups.

*Example VII*

A polymer was prepared in the manner described in Example I using diethyl alpha-phthalimidosebacate as the sole diester and ethylene glycol in 200% excess. The polymer contained 3.75% nitrogen which corresponds to the calculated nitrogen content for a polymer of the following structure,

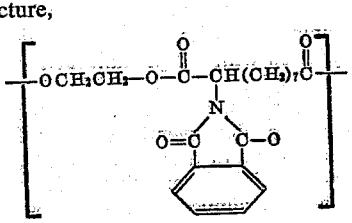

If alpha, alpha'-diphthalimidosebacic acid is used, polymers having up to about 7.5% nitrogen can be produced.

*Example VIII*

Amino glycols (e. g. 13-aminopentacosane-1,25-diol)

can be converted to the phthalimido derivative by reaction with phthalic anhydride as follows:

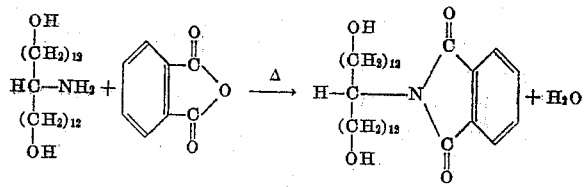

The anhydride reacts preferentially with the amino group. The resultant phthalimido glycol can be reacted with a dicarboxylic compound, such as terephthalic acid, sebacic acid, adipic acid and similar acids, with or without additional glycol to form condensation polymers containing the phthalimido group. Similarly, other phthalimido glycols, such as 7-phthalimidotridecane-1,13-diol or 12-phthalimidotricosane-1,23-diol may be prepared and reacted in the manner herein described to form condensation polymers containing the phthalimido group. Such polymers are not dyeable with acid colors, but they are altered by hydrolysis to provide primary amine groups in the polymer structure and these polymers are readily dyeable with acid colors.

*Example IX*

Oximino diesters are also converted to phthalimido diesters by the following synthesis:

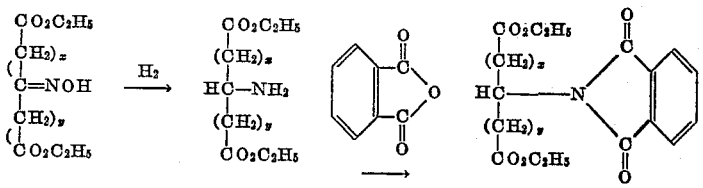

In the described reactions of this example $x=y=6$ or 11, but other values may be given to $x$ and $y$ as will be apparent to one skilled in the art. The phthalimido diesters may be reacted with glycol, with or without additional diester to form condensation polymers containing the phthalimido group. Although such polymers are not dyeable with acid colors, they are converted by hydrolysis to polymers provided with primary amine groups which are readily dyeable with acid colors.

In the cyclic dicarboxylimido group

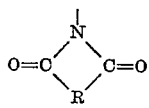

R represents a divalent radical, for example, ethylene group, 1,2-propylene group, 1,2-phenylene group or said groups substituted by one or more alkyl, alkoxy, phenyl or the like. In the aliphatic imido derivatives, it is preferred that in the R group the carbon atoms adjacent to a carbonyl group bear at most only one such substituent. The free bond of the nitrogen is attached to an inner chain carbon of a dibasic acid or the anhydride or ester thereof, or of a glycol so that this modifying compound may take part in any of the usual condensation polymerization reactions. Among the useful condensable diacids or the anhydrides or diesters thereof, containing the cyclic carboxylimido group, besides those of the examples are diethyl alpha-phthalimidoglutarate, alpha-phthalimidoglutaric anhydride, dimethyl alpha-phthalimidosebacate, dimethyl alpha-phthalimidoadipate, dimethyl 2-(N-phthalimidomethylene) terephthalate, dimethyl alpha, alpha'-diphthalimidoadipate, diethyl alpha-succinimidoadipate, dimethyl alpha-phthalimidosuberate, diethyl alpha-phthalimidopimelate, diethyl alpha-phthalimidoazelate, diethyl alpha-glutarimidosebacate, diethyl alphatetrahydrophthalimidosebacate and similar compounds.

Other methods and systems of condensation polymerization may be used than those shown in the examples of this invention as will be readily apparent to one skilled in the art. Also, other polymerizing reactants may be involved in addition to the primary chain-forming ingredients and the compound containing the cyclic dicarboxylimido group.

Instead of or along with ethylene glycol, there may be used polyglycols such as polyethylene glycol. Such glycols may be compounds having the structure $$HO(CH_2)_2-(OCH_2CH_2)_nO(CH_2)_2OH$$

wherein $n$ is an integer varying from 1 to 135 or more. The glycol may be ethylene glycol, propanediol-1,3, butanediol-1,4, polytetramethylene oxide glycol, polyethylene glycol and similar compounds.

The hydrolysis of the cyclic dicarboxyl imido group may be effected in numerous ways, although preferred conditions are such as to avoid substantial degradation of the polymer structure. When phthalimido groups are present, hydrolysis may be advantageously carried out with a hot alcoholic solution of hydrazine. Alcoholic or aqueous solutions of ethylene diamine are also especially useful in maintaining good properties in the structure while effectively removing the cyclic dicarboxyl group. Usually, the dibasic acid component of the imido residue is completely removed, but not necesarily so. Further, all of the imido residues need not be converted to amine groups. It is preferred, however, to remove the imido residues completely, for the best dye affinity is produced by so doing.

By means of this invention, condensation polymer structures acquire important affinity for acid dyes and without sacrifice of desirable properties of the structure. The polymerization proceeds smoothly and with the production of a high quality polymer, which polymer may be melt-spun or otherwise subjected to high temperature shaping without degradation of the polymer. After the need for subjecting the polymer to high temperature is passed, the chemical structure of the polymer may be readily altered, either before or after drawing, to free the primary amine group and thus confer acid dye affinity to the structure.

Any modification which conforms to the principles of the invention described herein is intended to be included within the scope of the claims below.

I claim:

1. A shaped article prepared from a linear fiber-forming polymeric dicarboxylic acid-diglycol ester by a hot-melt extruding process, the said polymeric ester having an imido side group which upon hydrolysis with hydrazine is converted to an $NH_2$ group, and is then dyeable with acid dyes.

2. A polymeric ester in accordance with claim 1 which contains from about 0.2% to about 7.5% nitrogen.

3. A polymeric ester in accordance with claim 1 which contains about 0.5% nitrogen.

4. A linear polymeric ester fiber prepared by hot-melt spinning, said polymeric ester containing the group

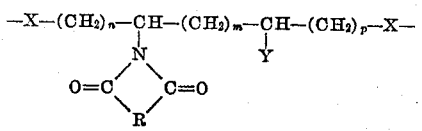

where in X is selected from the group consisting of

and —O—; each of $n$, $m$ and $p$ is an integer with a value between zero and 20, providing their sum is at least 2 and not more than 40; Y is selected from the group consisting of hydrogen and a cyclic dicarboxylimido group; and R is a divalent radical, the cyclic imido group being convertible to $NH_2$ by hydrolysis with hydrazine.

5. A polymer in accordance with claim 4 wherein X is

Y is hydrogen; R is a 1,2-phenylene group; $n$ and $p$ are each zero; and $m$ is 6.

6. A polymer in accordance with claim 4 wherein X is

Y is hydrogen; R is a 1,2-ethylene group; $n$ and $p$ are each zero; and $m$ is 6.

7. A polymer in accordance with claim 4 wherein X is

Y is hydrogen; R is a 1,2-phenylene group; $n$ and $p$ are each zero; and $m$ is 2.

8. A process for the conversion of a cyclic dicarboxylimido group contained in a polymeric ester to an amino group which comprises treating said polymer with an agent selected from the group consisting of ethylene diamine and hydrazine, and thereafter dyeing the said polymeric ester with an acid dye.

9. A process in accordance with claim 8 wherein said agent is hydrazine.

10. A process in accordance with claim 8 wherein said agent is ethylene diamine.

11. In the process of preparing filaments of a linear polymeric ester dyeable with an acid dye, the steps which comprise forming at least one imido group on a side chain of the polymeric ester, hot-melt spinning the said polymeric ester containing the imido groups to form a filament, drawing the same, and converting the imido nitrogen to an $NH_2$ group.

References Cited in the file of this patent

UNITED STATES PATENTS

| | | |
|---|---|---|
| 2,304,729 | Bruson | Dec. 8, 1942 |
| 2,403,533 | Kaszuba | July 9, 1946 |
| 2,609,348 | DuPuis et al. | Sept. 2, 1952 |
| 2,643,958 | Kleiner et al. | June 30, 1953 |

OTHER REFERENCES

Sprung: J. A. C. S., vol. 61, pp. 3381–85, December 1939.

Reynolds et al.: J. A. C. S., vol. 69, p. 911 et seq., April 1947.